(12) United States Patent
Ramesh

(10) Patent No.: US 6,256,290 B1
(45) Date of Patent: *Jul. 3, 2001

(54) MULTI-CARRIER CDMA TRANSMISSION SYSTEM WITH FREQUENCY AND TRANSMIT DIVERSITY

(75) Inventor: Nallepilli Subramanian Ramesh, New Providence, NJ (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,537

(22) Filed: Jan. 13, 1998

Related U.S. Application Data

(63) Continuation-in-part of application No. 08/712,831, filed on Sep. 13, 1996, now Pat. No. 5,956,345, and application No. 08/712,832, filed on Sep. 13, 1996, now Pat. No. 5,805,567.

(51) Int. Cl.$^7$ ................................................. H04L 27/26
(52) U.S. Cl. ..................... 370/204; 370/209; 370/339; 370/343; 370/480; 375/267
(58) Field of Search ................................. 370/203, 204, 370/208, 209, 210, 329, 330, 334, 335, 342, 441, 343, 328, 339, 480, 482; 375/200, 206, 208, 267, 130, 146

(56) References Cited

U.S. PATENT DOCUMENTS

| | | | |
|---|---|---|---|
| 5,521,937 | 5/1996 | Kondo et al. ........................ | 375/206 |
| 5,652,764 | * 7/1997 | Kanzaki et al. .................... | 375/200 |
| 5,822,359 | * 10/1998 | Bruckert et al. ................... | 375/200 |
| 5,887,020 | * 3/1999 | Smith et al. ......................... | 375/200 |
| 5,914,933 | * 6/1999 | Cimini et al. ...................... | 370/208 |

\* cited by examiner

*Primary Examiner*—Ricky Ngo
(74) *Attorney, Agent, or Firm*—Jason Paul DeMont; Wayne S. Breyer; DeMont & Breyer, LLC

(57) ABSTRACT

A wideband CDMA transmission system is disclosed that incorporates transmit diversity in both frequency and space. Some embodiments of the present invention are capable of transmitting a wideband signal with a high data rate to an appropriately-designed wideband CDMA wireless terminal and are also capable of transmitting a narrowband (e.g, IS-95 compliant) signal to a CDMA wireless terminal in the prior art. Some embodiments of the present invention are capable of co-existing in the same frequency spectrum that is allocated to existing narrowband wireless systems. And in some embodiments of the present invention the coded symbols from the interleaver are distributed among multiple carriers that are then radiated by spatially separated antennas.

An illustrative embodiment of the present invention comprises: receiving a datastream of symbols that is to be transmitted to one wireless terminal; distributing at least some of the datastream of symbols to a first derivative datastream of symbols; distributing at least some of the datastream of symbols to a second derivative datastream of symbols; modulating the first derivative datastream of symbols onto a first carrier frequency to create a first modulated carrier; modulating the second derivative datastream of symbols onto a second carrier frequency that is different that the first carrier frequency to create a second modulated carrier; radiating the first modulated carrier from a first antenna; and radiating the second modulated carrier from a second antenna that is separated from the first antenna.

14 Claims, 8 Drawing Sheets

400

MULTI-CARRIER CDMA TRANSMISSION SYSTEM WITH FREQUENCY AND TRANSMIT DIVERSITY

CROSS-REFERENCES TO RELATED APPLICATIONS

This application is a continuation-in-part of both application Ser. No. 08/712,831, filed Sep. 13, 1996, now U.S. Pat. No. 5,956,345 and application Ser. No. 08/712,832, filed Sep. 13, 1996, now U.S. Pat. No. 5,805,567 both of which are incorporated by reference.

FIELD OF THE INVENTION

The present invention relates to wireless telecommunications in general, and, more particularly, to a multi-carrier code-division multiple access ("CDMA") transmitter with transmit diversity.

BACKGROUND OF THE INVENTION

FIG. 1 depicts a schematic diagram of a portion of a typical wireless telecommunications system in the prior art, which system provides wireless telecommunications service to a number of wireless terminals (e.g., wireless terminals 101-1 through 101-3) that are situated within a geographic region. The heart of a typical wireless telecommunications system is Wireless Switching Center ("WSC") 120, which may also be known as a Mobile Switching Center ("MSC") or Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to local and long-distance telephone and data networks (e.g., local-office 130, local-office 139 and toll-office 140). Wireless Switching Center 120 is responsible for, among other things, establishing and maintaining calls between wireless terminals and between a wireless terminal and a wireline terminal, which is connected to the system via the local and/or long-distance networks.

The geographic area serviced by a wireless telecommunications system is partitioned into a number of spatially distinct areas called "cells." As depicted in FIG. 1, each cell is schematically represented by a hexagon; in practice, however, each cell usually has an irregular shape that depends on the topography of the terrain serviced by the system. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120. Upon receipt of the information, and with the knowledge that it is intended for wireless terminal 101-2, Wireless Switching Center 120 then returns the information back to base station 103-1, which relays the information, via radio, to wireless terminal 101-2.

When base station 103-1 is capable of communicating with wireless terminals 101-1 and 101-2 using code-division multiple access ("CDMA") technology, FIG. 2 depicts a block diagram of the salient components that base station 103-1 uses to prepare the datastream of symbols for transmission on the forward channel in accordance with IS-95. Base station 103-1 typically comprises demultiplexor 201, a bank of c forward channel radios, 203-1 through 203-c, summer 205, amplifier 207 and transmit antenna 209, interconnected as shown.

A multiplexed datastream of symbols from wireless switching center 120, comprising up to c datastreams is received by demultiplexor 201, in well-known fashion, wherein each of the individual datastreams are intended for transmission over a unique forward channel to a wireless terminal. Demultiplexor 201 demultiplexes the c datastreams, in well-known fashion, and routes each individual datastream to one of c forward channel radios, 203-1 through 203-c. Each forward channel radio spreads the received datastream into a 1.25 wide MHz forward channel signal, in well-known fashion, and then modulates the spread datastream onto a carrier, also in well-known fashion. As is well-known in the prior art, each forward channel radio can modulate the spread datastream onto any one of the available carrier signals available for use by that base station. The output of each of the c forward channel radios, 203-1 through 203-c, is summed by summer 205, amplified by amplifier 207 and radiated by antenna 209, in well-known fashion.

FIG. 3 depicts a block diagram of a typical IS-95 compliant forward channel radio in the prior art. Forward channel radio 203-i typically comprises: convolutional encoder 301, symbol repeater 303, block interleaver 305, multiplier 307, long code generator 309, decimator 311, multiplier 315, and modulator 317, interconnected as shown.

One disadvantage with a IS-95 forward channel in the prior art is that it has a rather limited data rate capacity, and, therefore, the need exists for a CDMA forward channel that is capable of a greater data rate. As is well-known in the prior art, one technique for increasing the data rate of the CDMA forward channel is to widen its band to 5 MHz or 10 MHz or more.

SUMMARY OF THE INVENTION

Some embodiments of the present invention are capable of transmitting a wideband CDMA forward channel signal without some of the costs and restrictions associated with techniques in the prior art. In particular, some embodiments of the present invention enjoy three distinct advantages.

First, some embodiments of the present invention are capable of transmitting a wideband (e.g., 5 MHz, 10 MHz, etc.) signal with a high data rate to an appropriately-designed wideband CDMA wireless terminal and are also capable of transmitting a narrowband (e.g., 1.25 MHz, etc.) signal to a CDMA wireless terminal in the prior art. This is advantageous because it means that embodiments of the present invention are backward compatible with millions of existing CDMA wireless terminals. To accomplish this, some embodiments of the present invention generate a wideband forward channel from two or more frequency-disparate sub-channels. Advantageously, each sub-channel is a narrowband signals that can be, but is not necessarily, compliant with an existing narrowband standard (e.g., IS-95).

Second, the generation of a wideband forward channel from multiple frequency-disparate sub-channels enables embodiments of the present invention to utilize spatial transmit diversity (i e., at least one of the frequency-disparate sub-channels is transmitted from an antenna that is some distance from another antenna that is used to transmit the other sub-channels). This is particularly advantageous because a forward channel constructed in this way is more robust to interference, distortion and fading. Furthermore, because the respective sub-channels use different carrier frequencies, and hence are orthogonal, they do not interfere with each other. This is in contrast with the prior art in which delayed versions of the "same" signal are transmitted from different antennas and cause self interference.

Third, some embodiments of the present invention are capable of co-existing in the same frequency spectrum that is allocated to existing narrowband wireless systems. This property, which is also known as "overlay," is advantageous because the system can simultaneously support narrowband terminals (e.g., IS-95, etc.) and wideband terminals without mutual interference.

An illustrative embodiment of the present invention comprises: receiving a datastream of symbols that is to be transmitted to one wireless terminal; distributing at least some of the datastream of symbols to a first derivative datastream of symbols; distributing at least some of the datastream of symbols to a second derivative datastream of symbols; modulating the first derivative datastream of symbols onto a first carrier frequency to create a first modulated carrier; modulating the second derivative datastream of symbols onto a second carrier frequency that is different that the first carrier frequency to create a second modulated carrier; radiating the first modulated carrier from a first antenna; and radiating the second modulated carrier from a second antenna that is separated from the first antenna.

DETAILED DESCRIPTION

Figure 1:
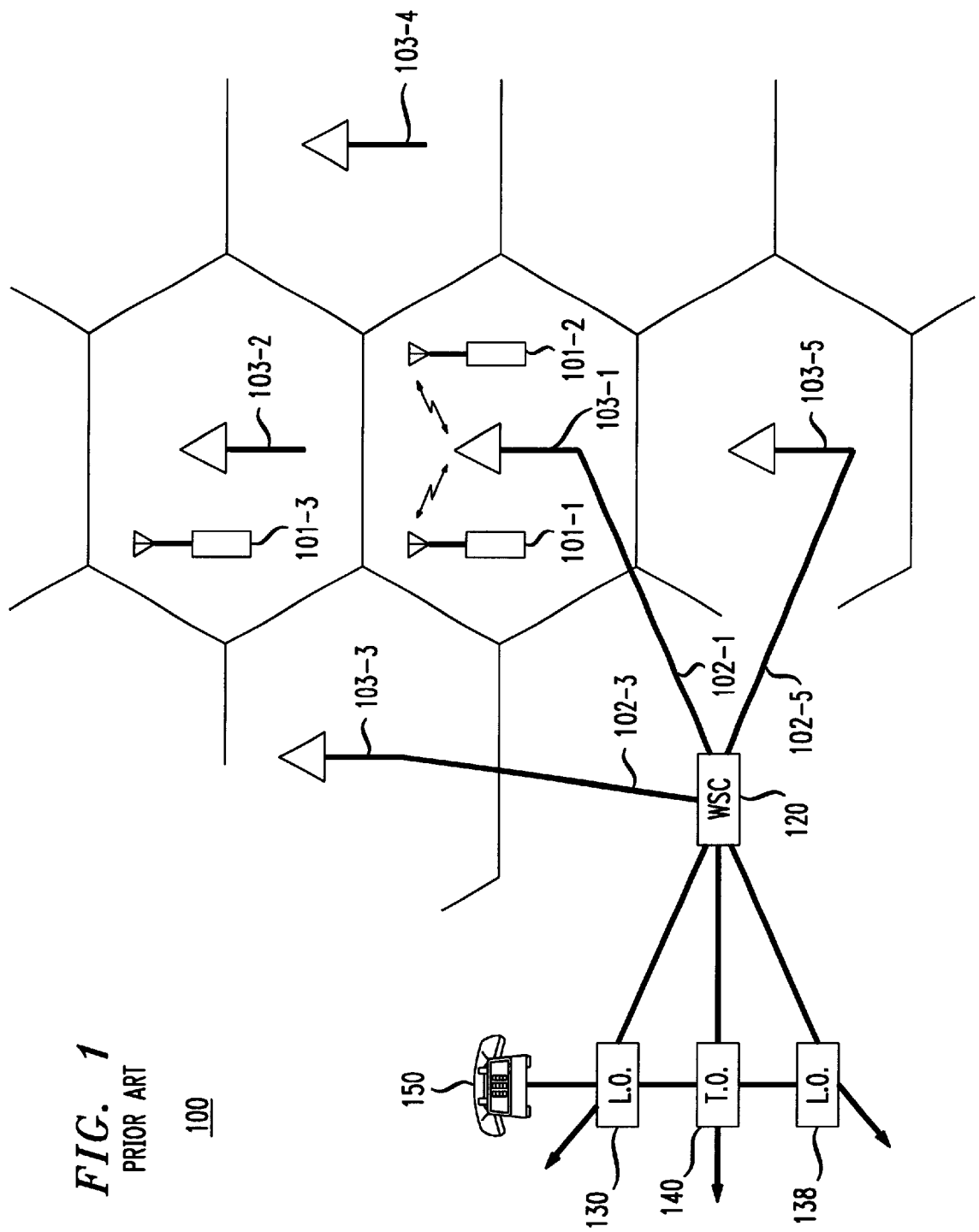
FIG. 1 depicts a schematic diagram of a wireless telecommunications system in the prior art.
Figure 2:
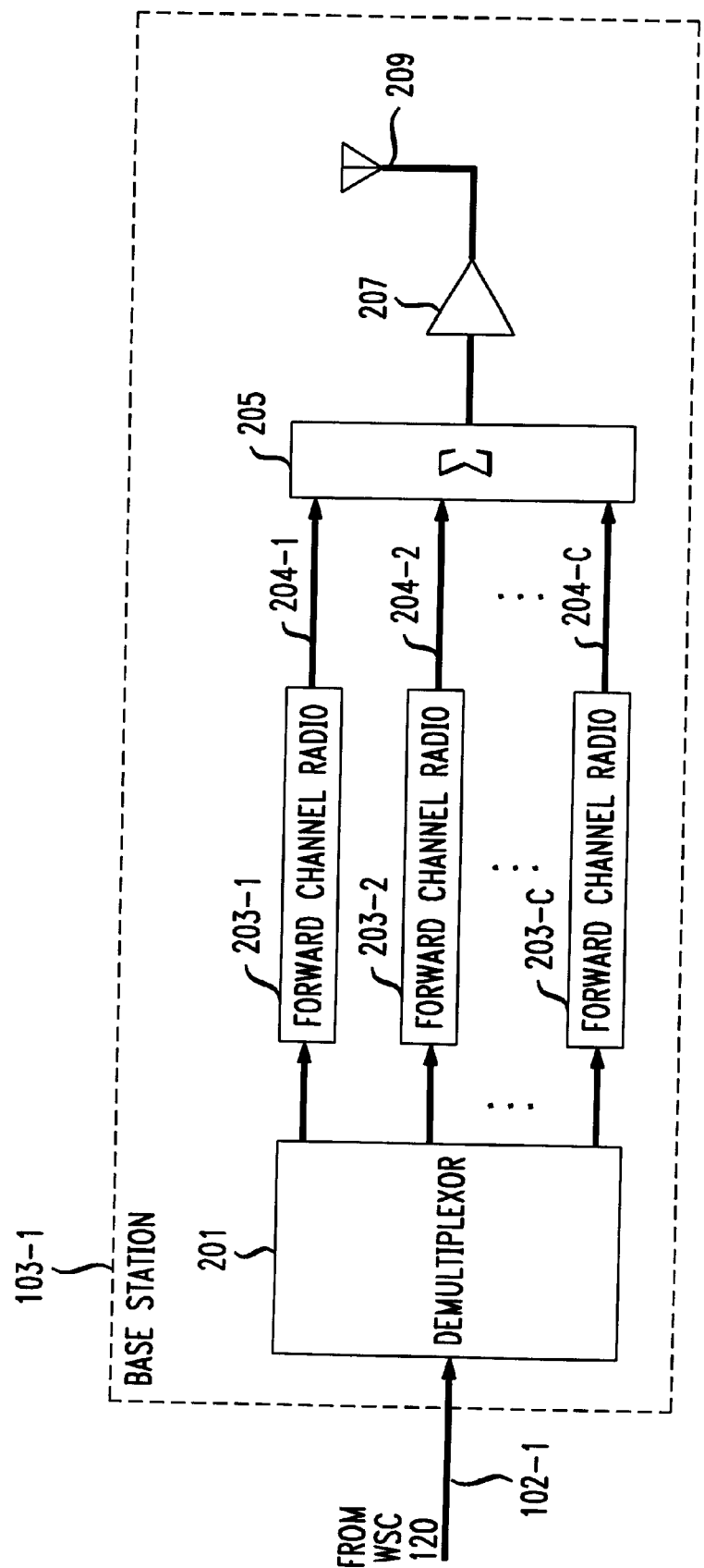
FIG. 2 depicts a block diagram of the forward channel components in a CDMA base station in the prior art.
Figure 3:
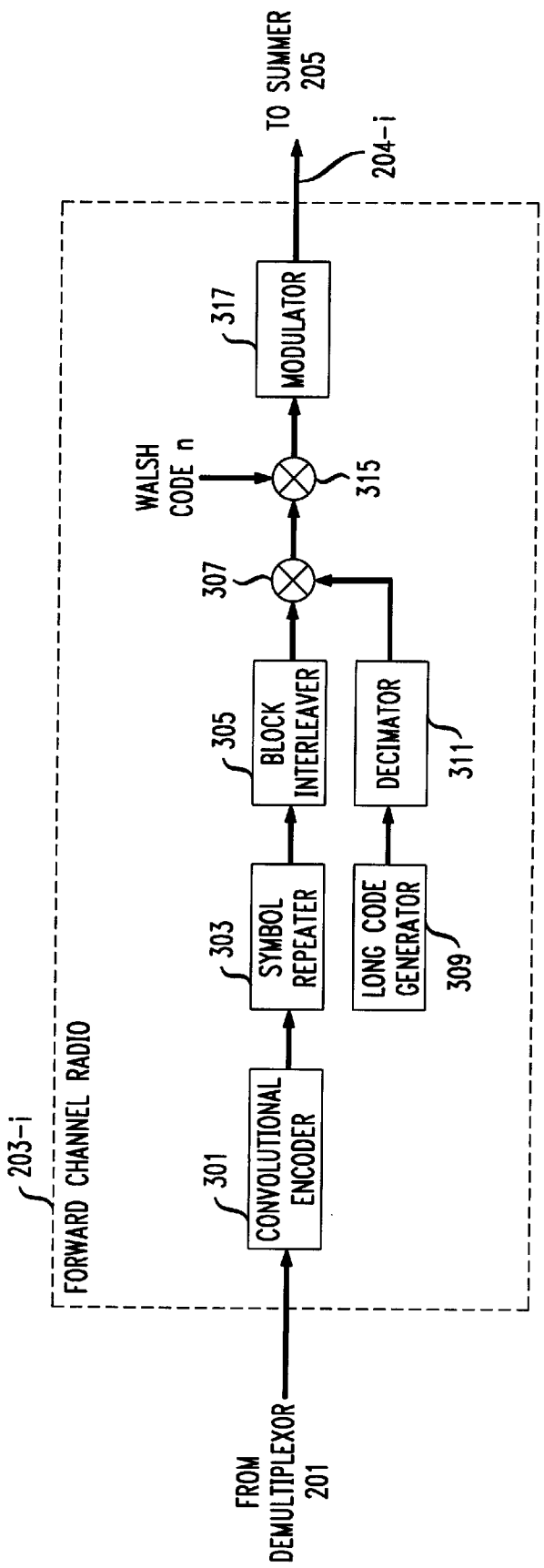
FIG. 3 depicts a block diagram of the salient components of a CDMA forward channel radio in the prior art.
Figure 4:
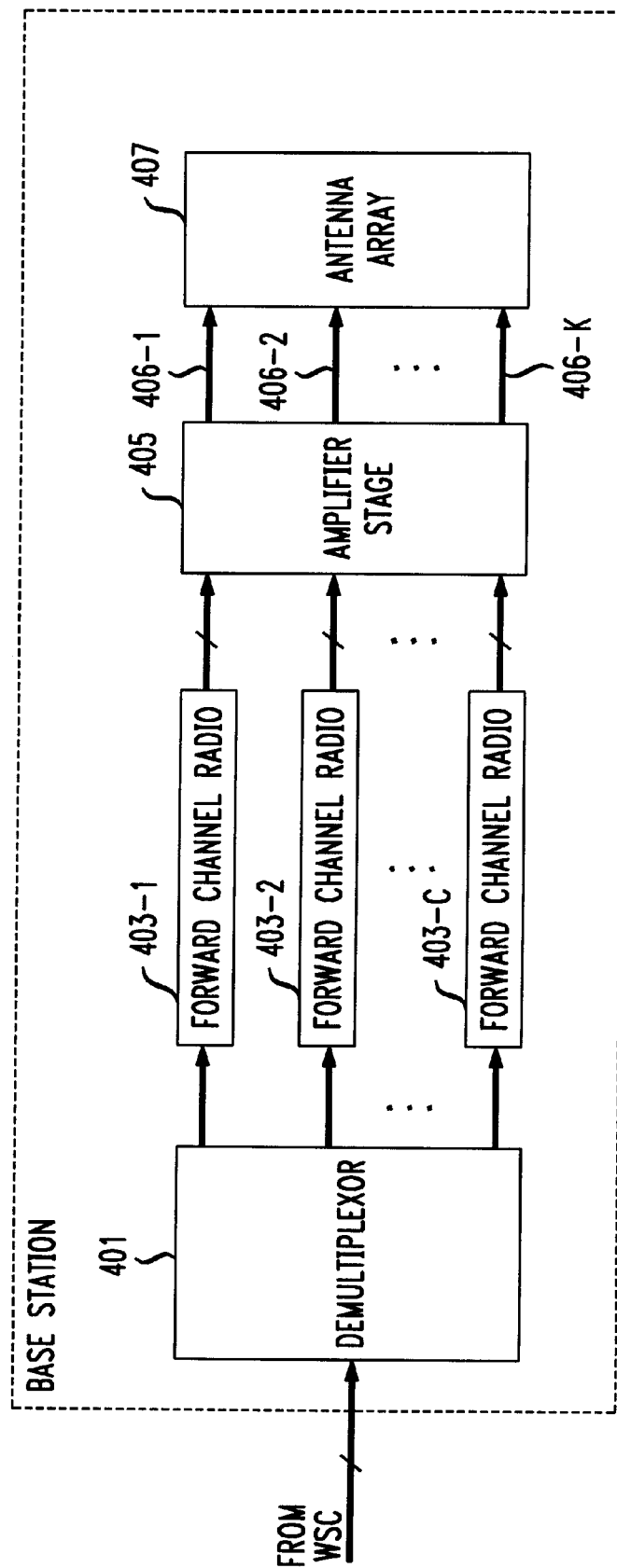
FIG. 4 depicts a block diagram of the forward channel components in a CDMA base station in accordance with the illustrative embodiment of the present invention.

FIG. 4 depicts a block diagram of the salient components of base station 400, in accordance with the illustrative embodiment of the present invention, for the generation and transmission of c forward channels to c wireless terminals (not shown).

In accordance with the illustrative embodiment, a multiplexed datastream of symbols, from a wireless switching center (not shown), comprising c datastreams of symbols is advantageously received by demultiplexor 401, in well-known fashion. Advantageously, each of the c datastreams is intended for transmission over a unique forward channel to a unique one of the c wireless terminals (not shown), in well-known fashion. In accordance with the illustrative embodiment, demultiplexor 401 demultiplexes the c datastreams and routes each datastream to one of c forward channel radios, 403-1 through 403-c, in well-known fashion.

In accordance with the illustrative embodiment, each of the c forward channel radios, 403-1 through 403-c, is capable of operating in: (1) IS-95 compatibility mode, or, alternatively, (2) a wideband mode that is not IS-95 compatible. When a forward channel radio is in IS-95 compatibility mode, it generates one IS-95 compliant 1.25 wide MHz forward channel signal, which can be received by an IS-95 compliant wireless terminal in the prior art. In contrast, when forward channel radio is in wideband mode, it generates a forward channel that comprises k 1.25 MHz wide sub-channels, on different carrier frequencies, as will be described in more detail below. It will be clear to those skilled in the art how to make and use embodiments of the present invention in which one or more of the c forward channel radios, 403-1 through 403-c, is capable of operating in another mode (e.g., TDMA, GSM, IS-41, TD/CDMA, etc.).

For pedagogical purposes, each forward channel radio is capable of operating in only two modes, a narrowband mode (e.g., IS-95 compatibility mode, etc.) and a wideband mode. It will be clear to those skilled in the art, however, how to make and use forward channel radios in accordance with the present invention that are capable of operating in one or more wideband modes or one or more narrowband modes or in a combination of the two. Furthermore, it will be clear to those skilled in the art that each forward channel radio is capable of switching between modes under software control, without changes in hardware, and on a call-by-call basis.

Each forward channel radio, 403-1 through 403-c, advantageously receives a unique datastream of symbols from demultiplexer 401 and encodes and modulates the datastream onto one or more of k different carrier frequencies. The salient components of a forward channel radio in accordance with the illustrative embodiment are shown in FIG. 5.

Figure 5:
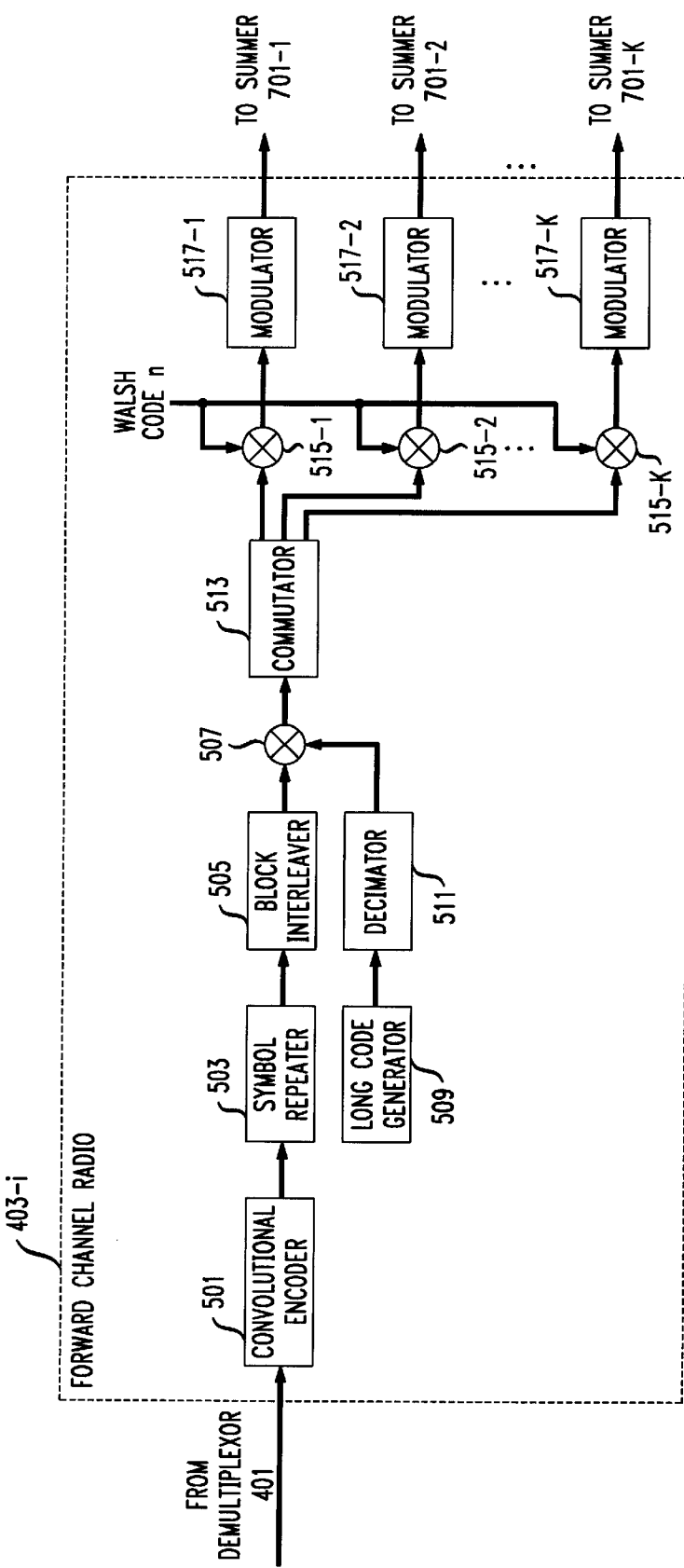
FIG. 5 depicts a block diagram of the salient components of a CDMA forward channel radio in accordance with the illustrative embodiment of the present invention.

FIG. 5 depicts a block diagram of the salient components of forward channel radio 403-i, in accordance with the illustrative embodiment of the present invention. Forward channel radio 403-i is capable of functioning in: (1) IS-95 compatibility mode, or (2) a wideband mode that is not IS-95 compatible. When the illustrative embodiment is in IS-95 compatibility mode, the illustrative embodiment generates one IS-95 compliant 1.25 MHz wide forward channel signal, which can be received by an IS-95 compliant wireless terminal in the prior art. In contrast, when the illustrative embodiment is in wideband mode, the illustrative embodiment generates and transmits a forward channel that comprises k 1.25 MHz wide signals, on different carrier frequencies.

Forward channel radio 403-i advantageously comprises: convolutional encoder 501, symbol repeater 503, block interleaver 505, multiplier 507, long code generator 509, decimator 511, commutator 513, multipliers 515-1 through 515-k, and modulators 517-1 through 517-k, interconnected as shown.

In accordance with the illustrative embodiment of the present invention, a datastream of symbols from demultiplexor 401 is advantageously received by convolutional encoder 501, in well-known fashion. Convolutional encoder 501 advantageously encodes the datastream of symbols for error control, in well-known fashion. When the illustrative embodiment is in IS-95 compatibility mode, convolutional encoder 501 advantageously encodes the datastream of symbols in accordance with the IS-95 specification, in well-known fashion. When the illustrative embodiment is not in IS-95 compatibility mode, it will be clear to those skilled in the art how to chose an appropriate set of parameters for convolutional encoder 501.

The datastream of symbols from convolutional encoder 501 is received by symbol repeater 503, which repeats the symbols in the datastream, in well-known fashion, to provide a nominal symbol rate. When the illustrative embodiment is in IS-95 compatibility mode, symbol repeater 503 advantageously repeats the symbols in the datastream in accordance with the IS-95 specification. When the illustrative embodiment is not in IS-95 compatibility mode and simulcasting is desired, symbol repeater 503 advantageously repeats each symbol N times consecutively, where N is the number of carrier signals in the multi-carrier forward channel signal transmitted by the illustrative embodiment. When the illustrative embodiment is not in IS-95 compatibility mode and simulcasting is not desired, it will be clear to those skilled in the art how to chose an appropriate set of parameters for symbol repeater 503.

The datastream of symbols from symbol repeater 503 is advantageously received by block interleaver 505, which interleaves the symbols, in well-known fashion. When the illustrative embodiment is in IS-95 compatibility mode, block interleaver 505 advantageously interleaves the symbols in accordance with the IS-95 specification. When the illustrative embodiment is not in IS-95 compatibility mode and simulcasting is desired, the parameters for block interleaver 505 and commutator 513 are advantageously coordinated so that all of the datastreams exiting commutator 513 are identical. When the illustrative embodiment is not in IS-95 compatibility mode and simulcasting is not desired, it will be clear to those skilled in the art how to chose an appropriate set of parameters for block interleaver 505.

Long code generator 509 advantageously generates a pseudo-random signal, in well-known fashion, called the long code, which is the basis for a signal that is used to encrypt the datastream of symbols exiting block interleaver 505. When the illustrative embodiment is in IS-95 compatibility mode, long code generator 509 advantageously generates the long code in accordance with the IS-95 specification. When the illustrative embodiment is not in IS-95 compatibility mode, it will be clear to those skilled in the art how to chose an appropriate set of parameters for long code generator 509.

The long code from long code generator 509 is advantageously received by decimator 511, which decimates the long code, in well-known fashion. When the illustrative embodiment is in IS-95 compatibility mode, decimator 511 advantageously generates the long code in accordance with the IS-95 specification, in well-known fashion. When the illustrative embodiment is not in IS-95 compatibility mode, it will be clear to those skilled in the art how to chose an appropriate set of parameters for long decimator 511.

The datastream of symbols from block interleaver 505 is advantageously multiplied by the decimated long code from decimator 511 by multiplier 507, in well-known fashion, to encrypt the datastream of symbols. It will be clear to those skilled in the art how to make and use multiplier 507.

The encrypted datastream of symbols from multiplier 507 is received by commutator 513, which distributes each symbol in the datastream to one or more of N derivative datastreams of symbols. Each derivative datastream is a sub-channel in a wideband forward channel in accordance with the illustrative embodiment of the present invention.

Advantageously, each of the N derivative datastreams of symbols is uniquely associated with a different transmit carrier frequency. In accordance with the illustrative embodiment, derivative datastream k, for k=1 to N, is advantageously processed by multiplier 515-k, modulator 517-k, and amplifier 519-k, which modulates derivative datastream k onto carrier frequency k. Although the illustrative embodiment of the present invention depicts commutator 513 as generating up to three derivative datastreams, it will be clear to those skilled in the art how to make and use embodiments of the present invention that comprise N≧1 derivative datastreams.

When the illustrative embodiment is in IS-95 compatibility mode, commutator 513 directs all of the symbols in the received datastream of symbols to just one derivative datastream of symbols, which derivative datastream is associated with one carrier frequency. When the illustrative embodiment is not in IS-95 compatibility mode and simulcasting is desired, the parameters of symbol repeater 503, block interleaver 505 and commutator 513 are chosen so that all k of the derivative datastreams exiting commutator 513 are identical. Alternatively, when the illustrative embodiment is not in IS-95 compatibility mode and simulcasting is not desired, commutator 513 advantageously distributes each symbol in the received datastream of symbols in round-robin fashion to each derivative datastream.

Each multiplier, 515-1 through 515-k, advantageously multiplies the symbols in derivative datastream k, respectively, by an orthogonal code (e.g., Walsh code, etc.), in well-known fashion, that enables the wireless terminal to which derivative datastream k is directed to distinguish derivative datastream k from other signals. Advantageously, each derivative datastream k is multiplied by the same orthogonal code, which orthogonal code is associated with the wireless terminal to which the forward channel is directed.

Figure 6:
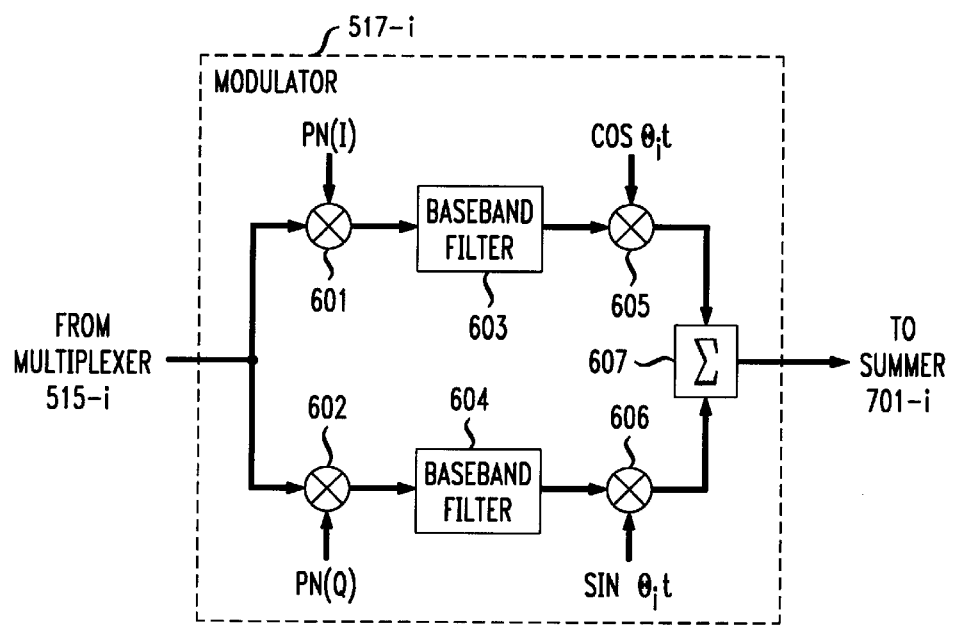
FIG. 6 depicts a block diagram of the salient components of a CDMA modulator in accordance with the illustrative embodiment of the present invention.
Figure 7:
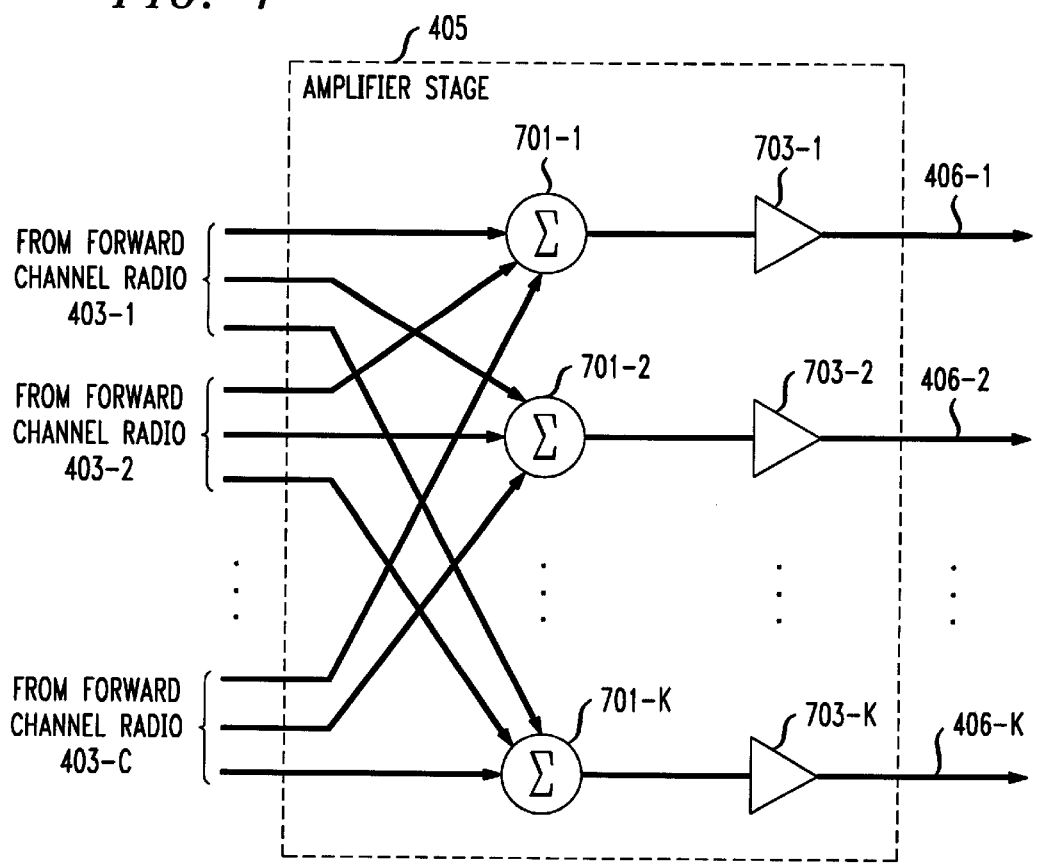
FIG. 7 depicts a block diagram of the salient components of an amplifier stage in accordance with the illustrative embodiment of the present invention.

Each modulator, 517-1 through 517-k, advantageously spreads derivative datastream k and modulates, using quadrature phase-shift keying ("QPSK"), datastream respectively, onto carrier frequency k, in well-known fashion, and outputs the result to summer 701-i of amplifier state 405, which is shown in FIG. 7. FIG. 6 depicts a block diagram of the salient components of modulator 517-i, for i=1 to k, in accordance with the illustrative embodiment of the present invention.

Derivative datastream i enters modulator 517-i and is advantageously processed by two channels. The "I" or "in-phase" channel comprises multiplier 601, baseband filter 603 and multiplier 605, and the "Q" or "quadrature-phase" channel comprises multiplier 602, baseband filter 604 and multiplier 606. The output of multiplier 605 and multiplier 606 are summed by summer 607 and the sum is forwarded to summer 701-i. Multiplier 601 advantageously multiplies or "spreads" datastream i by an in-phase pseudo-random sequence that is associated with the wireless terminal to which the forward channel is directed, and multiplier 602 spreads datastream i by an quadrature-phase pseudo-random sequence that is also associated with the wireless terminal, in well-known fashion.

Baseband filter 603 and baseband filter 604 are advantageously low-pass filters with a cut-off frequency equal to the width of a narrowband signal in accordance with the illustrative embodiment, which is 1.25 MHz.

Multiplier 605 advantageously multiplies the output of baseband filter 603 with an in-phase carrier whose frequency is $\theta_i$ and multiplier 606 multiplies the output of baseband filter 604 with a quadrature-phase carrier whose frequency is also $\theta_i$. It will be clear to those skilled in the art how to make modulator 517-i.

Referring to FIG. 4, each of the k modulated carriers from each of the c forward channel radios are amplified by amplifier stage 405, as depicted in FIG. 7, on a carrier-by-carrier basis. FIG. 7 depicts the salient components of amplifier stage 405, which advantageously comprises: k summers, 701-1 through 701-k, and k amplifiers, 703-1 through 703-k. Advantageously, summer 701-i, for i=1 to k, receives a modulated carrier at frequency i, from all c forward channel radios, 403-1 through 403-c, so that all of the carriers of the same frequency are summed together and are isolated from the other carrier frequencies. The output of summer 701-i is forwarded to amplifier 703-i, for i=1 to k. Amplifier 703-i advantageously amplifies the composite signal, in well-known fashion, and outputs the amplified signal to antenna array 407.

Figure 8:
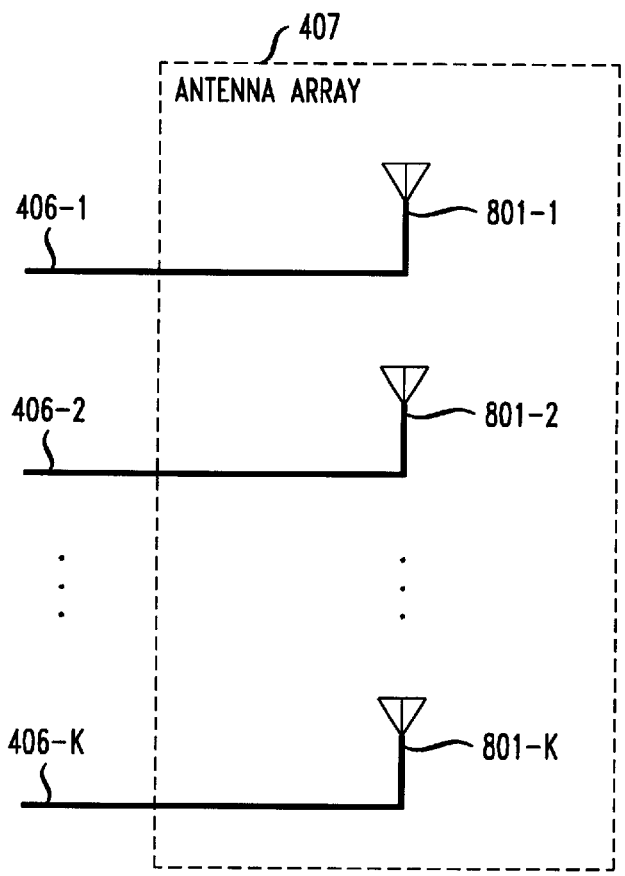
FIG. 8 depicts a block diagram of an spatial transmit diversity antenna array in accordance with the illustrative embodiment of the present invention.

FIG. 8 depicts the salient components in antenna array 407, which uniquely transmits all of the signals on carrier frequency $\theta_i$ on one of k antennas, 801-1 through 801-k, to achieve k-nary transmit diversity. Advantageously, each of antennas, 801-1 through 801-k, are separated by at least one wavelength of the highest frequency carrier $\theta_i$.

When forward channel radio 403-i is in IS-95 compliant mode, only one derivative datastream is created and only one signal for that forward channel is transmitted from one antenna in antenna array 407. In contrast, when forward channel radio 403-i is not in IS-95 compliant mode, and is in wideband mode, two or more derivative datastreams are created for that forward channel and each derivative datastream is modulated onto a different carrier frequency and advantageously transmitted from different antennas in antenna array 407.

By transmitting each derivative datastream on a different carrier frequency and from a different transmit antenna, the illustrative embodiment achieves frequency and space diversity in the forward channel, which significantly increases the spectral efficiency and overall traffic capacity of base station 400.

Furthermore, the illustrative embodiment enables a wideband channel to be overlaid on narrowband channels and the wideband channels to be backward-compatible with the narrowband channels. For example, consider the situation in which base station 400 needs to transmit two datastreams to two wireless terminals and the first datastream is to be IS-95 compliant and the second is to be wideband (i.e., not IS-95 compliant). Only one derivative datastream is created for the IS-95 compliant datastream, the datastream is modulated onto only one carrier frequency $\theta_i$, and radiated from one of antennas 801-1 through 801-k. In contrast, two more derivative datastreams are created for the wideband datastream, each derivative datastream is modulated onto a different carrier frequency, and each derivative datastream is radiated form a different one of antennas 801-1 through 801-k.

Figure 9:
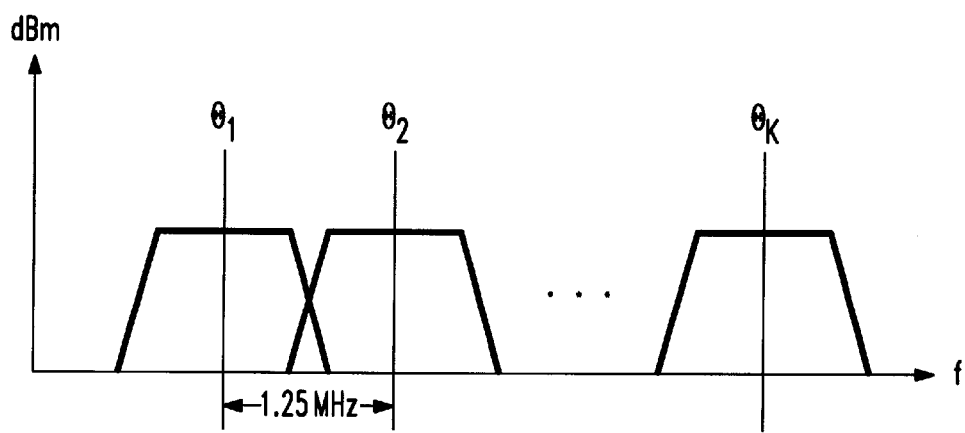
FIG. 9 depicts a graph of radiated power as a function of frequency and showing the relationship of the sub-channels radiated by an illustrative embodiment of the present invention.

FIG. 9 depicts a graph signal strength as a function of frequency for the forward channel in accordance with the illustrative embodiment of the present invention. It will be understood that a single carrier frequency, such as $\theta_2$, can, in accordance with the illustrative embodiment, carry one or more IS-95 compliant narrowband forward channels or a part of one or more wideband forward channels or a combination of the two.

Figure 10:
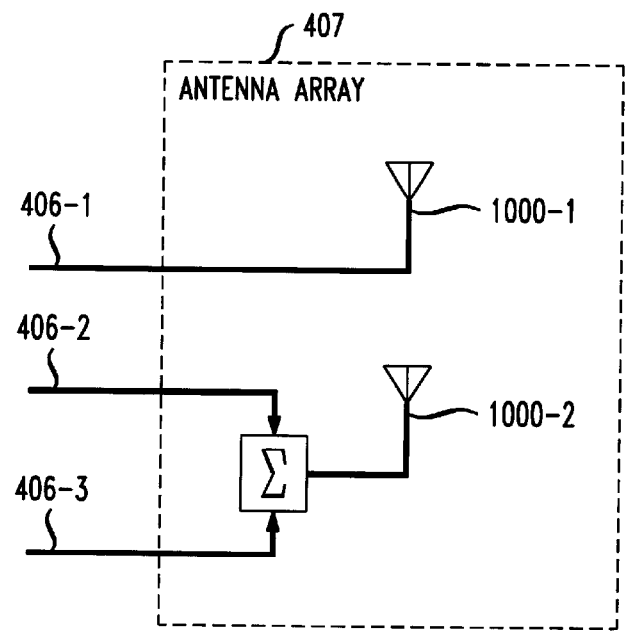
FIG. 10 depicts a block diagram of a dual spatial transmit diversity antenna array that can be used with the illustrative embodiment of the present invention.

FIG. 10 depicts a block diagram of an alternative embodiment of antenna array 407 in accordance with the illustrative embodiment of the present invention, in which there are fewer antennas in antenna array 407 than there are carrier frequencies transmitted by base station 400. In such case, the k carrier frequencies are distributed among the available antennas as evenly as possible to achieve as much spatial diversity as possible. Furthermore, advantageously, no wideband signal is constructed of sub-channels that are all radiated from the same antenna. In particular, FIG. depicts an embodiment of antenna array 407 in which there are k=3 carrier frequencies to be transmitted on only two antennas.

Figure 11:
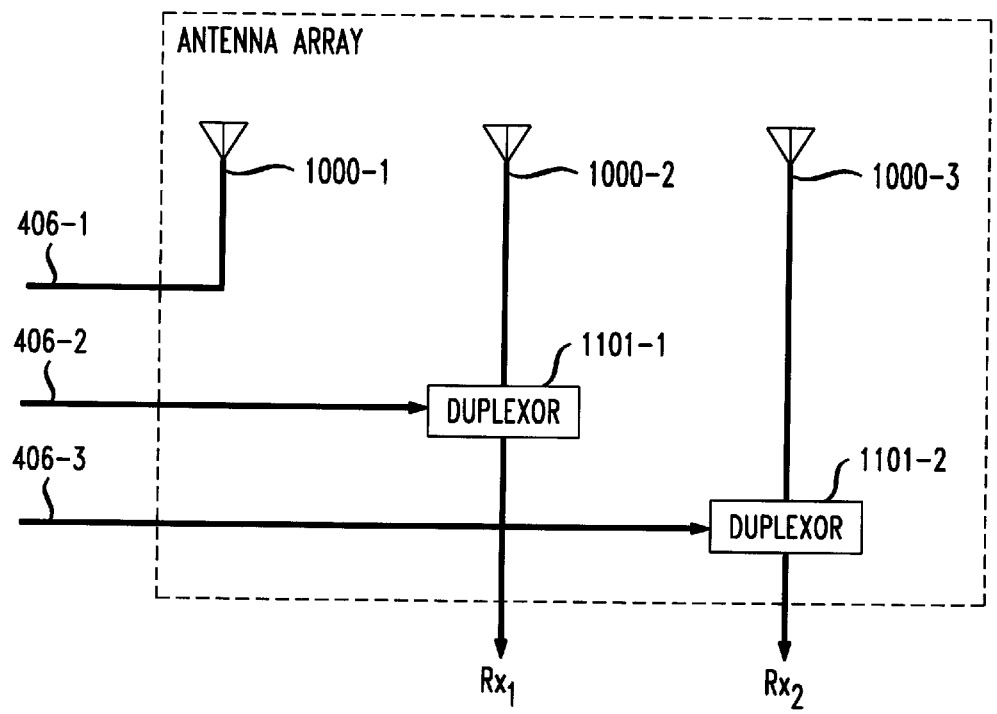
FIG. 11 depicts a block diagram of a triple spatial transmit diversity-dual spatial receive diversity antenna array that can be used with the illustrative embodiment of the present invention.

FIG. 11 depicts a block diagram of an another alternative embodiment of antenna array 407 in accordance with the illustrative embodiment of the present invention in which some of the antennas, antennas 1100-1 through 1100-k, are used for both spatial transmit diversity and spatial receive diversity. In such case, when k=2, duplexors 1101-1 and 1101-2 are used separate the two receive signals, $Rx_1$ and $Rx_2$ from the transmit signals, in well-known fashion. Furthermore, it will be clear to those skilled in the art how to combine the embodiments of antenna array 407 in FIG. 10 with the antenna array in FIG. 11 so as to enable both spatial transmit diversity and spatial receive diversity on two antennas.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. An apparatus comprising:

a commutator for receiving a datastream of symbols that is to be transmitted to one wireless terminal, for distributing at least some of said datastream of symbols to a first derivative datastream of symbols and at least some of said datastream of symbols to a second derivative datastream of symbols;

a first modulator for modulating said first derivative datastream of symbols onto a first carrier frequency to create a first modulated carrier;

a second modulator for modulating said second derivative datastream of symbols onto a second carrier frequency that is different that said first carrier frequency to create a second modulated carrier;

a first antenna for radiating said first modulated carrier;

a second antenna for radiating said second modulated carrier; and means for switching said apparatus between a narrowband mode in which said first modulated carrier is not radiated from said first antenna and a wideband mode in which said first modulated carrier is radiated from said first antenna and said second modulated carrier is radiated from said second antenna.

2. The apparatus of claim 1 wherein said datastream of symbols is a direct sequence spread spectrum signal.

3. The apparatus of claim 1 further comprising:
a first multiplier for modulating said first derivative datastream of symbols by a orthogonal code; and
a second multiplier for modulating said second derivative datastream of symbols by said orthogonal code.

4. The apparatus of claim 1 wherein said first derivative stream of symbols is identical to said second derivative stream of symbols.

5. The apparatus of claim 1 wherein said commutator distributes every other symbol in said datastream of symbols to said first derivative datastream of symbols and said second derivative datastream of symbols in round-robin fashion.

6. The apparatus of claim 1 wherein said commutator also distributes at least some of said datastream of symbols to a third derivative datastream of symbols, and further comprising:
a third modulator for modulating said third derivative datastream of symbols onto a third carrier frequency that is different that said first carrier frequency and said second carrier frequency to create a third modulated carrier.

7. The apparatus of claim 6 further comprising a third antenna for radiating said third modulated carrier.

8. A method of operating a radio, said method comprising:
receiving a datastream of symbols that is to be transmitted to one wireless terminal;
distributing at least some of said datastream of symbols to a first derivative datastream of symbols;
distributing at least some of said datastream of symbols to a second derivative datastream of symbols;
modulating said first derivative datastream of symbols onto a first carrier frequency to create a first modulated carrier;
modulating said second derivative datastream of symbols onto a second carrier frequency that is different that said first carrier frequency to create a second modulated carrier;
radiating said first modulated carrier from a first antenna only when said radio is in a wideband mode; and
radiating said second modulated carrier from a second antenna that is separated from said first antenna when said radio is in a wideband mode and when said radio is in a narrowband mode.

9. The method of claim 8 wherein said datastream of symbols is a direct sequence spread spectrum signal.

10. The method of claim 8 further comprising:
modulating said first derivative datastream of symbols by a orthogonal code; and
modulating said second derivative datastream of symbols by said orthogonal code.

11. The method of claim 8 wherein said first derivative stream of symbols is identical to said second derivative stream of symbols.

12. The method of claim 8 wherein said commutator distributes every other symbol in said datastream of symbols to said first derivative datastream of symbols and said second derivative datastream of symbols in round-robin fashion.

13. The method of claim 8 wherein said commutator also distributes at least some of said datastream of symbols to a third derivative datastream of symbols, and further comprising:
a third modulator for modulating said third derivative datastream of symbols onto a third carrier frequency that is different that said first carrier frequency and said second carrier frequency to create a third modulated carrier.

14. The apparatus of claim 6 further comprising a third antenna for radiating said third modulated carrier.

\* \* \* \* \*